(12) United States Patent
Lee et al.

(10) Patent No.: US 9,030,468 B2
(45) Date of Patent: *May 12, 2015

(54) METHOD FOR DEPTH MAP GENERATION

(75) Inventors: Gwo Giun (Chris) Lee, Tainan (TW); He-Yuan Lin, Tainan (TW); Ming-Jiun Wang, Tainan (TW); Chun-Fu Chen, Tainan (TW)

(73) Assignee: National Cheng Kung University, Tainan (TW)

( * ) Notice: Subject to any disclaimer, the term of this patent is extended or adjusted under 35 U.S.C. 154(b) by 405 days.

This patent is subject to a terminal disclaimer.

(21) Appl. No.: 13/456,280

(22) Filed: Apr. 26, 2012

(65) Prior Publication Data

US 2012/0293499 A1 Nov. 22, 2012

Related U.S. Application Data

(60) Provisional application No. 61/478,965, filed on Apr. 26, 2011.

(51) Int. Cl.
*G06T 19/00* (2011.01)
*G06T 7/00* (2006.01)

(52) U.S. Cl.
CPC ..... *G06T 7/0071* (2013.01); *G06T 2207/10016* (2013.01); *G06T 2207/10024* (2013.01)

(58) Field of Classification Search
CPC ......... G06T 19/00; G06T 17/20; G06T 17/00; G06T 2207/10028; G06T 7/0071; G06T 2200/04; H04N 13/0022; H04N 13/0271; H04N 7/26; H04N 13/0029; H04N 13/0037; H04N 19/00769; H04N 13/0055; G06K 9/36; G06K 9/34

See application file for complete search history.

(56) References Cited

U.S. PATENT DOCUMENTS

| 6,700,999 B1 * | 3/2004 | Yang ............................. 382/118 |
| 2008/0212879 A1 * | 9/2008 | Torii et al. ..................... 382/195 |
| 2010/0014781 A1 | 1/2010 | Liu et al. |

OTHER PUBLICATIONS

Zheng, Yufeng. "Breast cancer detection with gabor features from digital mammograms." algorithms 3.1 (2010): 44-62.*
Chen, Yen-Liang, and Hui-Ling Hu., "An overlapping cluster algorithm to provide non-exhaustive clustering." European Journal of Operational Research 173.3 (2006): 762-780.*

(Continued)

*Primary Examiner* — Mark Zimmerman
*Assistant Examiner* — Sarah Le
(74) *Attorney, Agent, or Firm* — Bacon & Thomas, PLLC

(57) ABSTRACT

A method for depth map generation is disclosed, capable of generating a depth map corresponding an image signal, for the application of a 2D to 3D image transformation system. In the depth map generated by the disclosed method, each of the plural image regions of the image signal is assigned with a depth value. Besides, by means of comparing the depth map with another depth map of the earlier time point, the disclosed method can generate a modulated depth map, for assigning a depth value to each of the plural image regions of the image signal more precisely. Thus, the transformation performance and efficiency of the 2D to 3D image transformation system are hereby improved.

12 Claims, 13 Drawing Sheets

(56) References Cited

OTHER PUBLICATIONS

Battiato, Sebastiano, et al., "3D stereoscopic image pairs by depth-map generation." 3D Data Processing, Visualization and Transmission, 2004. 3DPVT 2004. Proceedings. 2nd International Symposium on. IEEE, 2004.*

Matthies, Larry, Takeo Kanade, and Richard Szeliski. "Kalman filter-based algorithms for estimating depth from image sequences." International Journal of Computer Vision 3.3 (1989): 209-238.*

* cited by examiner

METHOD FOR DEPTH MAP GENERATION

CROSS REFERENCE TO RELATED APPLICATION

This application claims the benefit of filing date of U.S. Provisional Application Ser. No. 61/478,965, entitled "Method for Converting from a 2-Dimensional Video to a 3-Dimensional Video" filed Apr. 26, 2011 under 35 USC §119(e)(1).

BACKGROUND OF THE INVENTION

1. Field of the Invention

The present invention relates to a depth map generation method, in particular to a depth map generation method for producing a depth map belonging to an image signal so as to provide for use in an image conversion system for converting a two-dimensional planar image signal to a three-dimensional stereoscopic image signal.

2. Description of Related Art

The depth value of each image region contained in an image signal serves as an indispensable part for the functioning of a display device for presenting a stereoscopic image. Indeed, an erroneous depth value will result in seriously unfocused stereoscopic images, and subsequently such can bring discomfort to user's viewing experience. In further illustration, in order for a user to visually perceive a stereoscopic image, the user must first receive through his/her eyes' vision gradient, dynamics gradient, and other depth sensitive constituents, so as to obtain a relative object positioning relationship, and therefore to allow the user's brain to visualize a stereoscopic image.

Among these depth perception constituents, motion parallax turns to be the most controlling factor since it originates from the positive correlation between an object's motion amount and the distance between the object and object's observer. For instance, in a hypothetical situation involving two cars moving at the same speed and an observer, the car that is farther away from the observer will appear to move slower than the car that is closer to the observer, therefore the observer can determine the relative distance between the two cars using such observation. In addition to motion parallax, other important depth perception constituents such as linear perspective (the apparent merging of two parallel railway tracks seen in a remote distance), atmospheric perspective (the apparent visual obscuration of objects seen in a remote distance due to effect of small-size particles in the air), texture gradient (the apparent observation that the object in a remote distance appears more dense), elevation (the apparent observation that the object located at a greater height looks more distant), overlapping (the apparent observation of relative position between objects from the blocking between objects), and relative size (the apparent observation of identical objects in which the object located in a remote distance appears smaller, and the object located in a closer distance appears larger). These depth perception constituents have been converted to algorithms and applied in various types of 2D to 3D image/video transformation system.

However, the algorithms resulting from each of the aforementioned depth perception constituents has its disadvantages, some algorithms are only based on the apparent shape of the image region, while some other algorithms are only based on the size of the image region, and even some algorithms are only based on the color feature of the image region, resulting in the produced depth maps not satisfying the actual requirements. Furthermore, these algorithms cannot precisely provide depth values to each of the image regions that are of particular interest to the viewer, causing the viewer not being able to see stereoscopic images of the components that are interesting to the viewer and therefore minimizing the viewing pleasure.

Therefore, there is a demand in the industry for a depth map generation method for producing a depth map belonging to an image signal so as to provide for use in an image conversion system for converting a two-dimensional planar image signal to a three-dimensional stereoscopic image signal.

SUMMARY OF THE INVENTION

The object of the present invention is to provide a depth map generation method, for producing a depth map corresponding to the image signal, based on the distribution of a region of interest of an image signal, and the aspect ratio value of each image region in an image signal.

In order to achieve the object, the depth map generation method of the present invention is provided, which is used to produce a depth map corresponding to an image signal, and the image signal comprises a plurality of image regions, and each image region in the depth map is designated with a depth value. The method comprises the following steps: (A) receiving an image region distribution map containing a plurality of image regions and a region of interest map containing a region of interest; (B) executing an aspect ratio testing process to each image region and an overlapping ratio calculation process to a region of interest; and (C) designating a depth value to each image region to produce a depth map based on a result from the aspect testing process and a result from the region of interest overlapping ratio calculation process; wherein, the image region has a plurality of image pixels, the aspect ratio testing process is used to calculate an aspect ratio value of the image region, and when the aspect ratio value of one of the image region is lower than the aspect ratio threshold value, the depth value designated to the image region and the depth value of another image region perpendicular and neighboring to the image region are identical; the region of interest overlapping ratio calculation process is used to calculate an overlapping ratio between the image region and the region of interest, and the image regions that are neighboring each other and of which each having an overlapping ratio higher than the overlapping ratio threshold value are all designated an identical depth value.

Accordingly, the depth map generation method of the present invention can produce a depth map corresponding to the image signal based on the distribution of region of interest in an image signal, and the aspect ratio value of each image region in the image signal. In addition, the depth map generation method of the present invention can also produce an adjusted depth map according to a depth map corresponding to the image signal, and a depth map according to the image signal from a prior point in time, so as to provide a a way to more precisely designate each image region of an image signal an adjusted depth value, to effectively increase the conversion efficiency of a 2D to 3D image/video transformation system.

Figure 1:
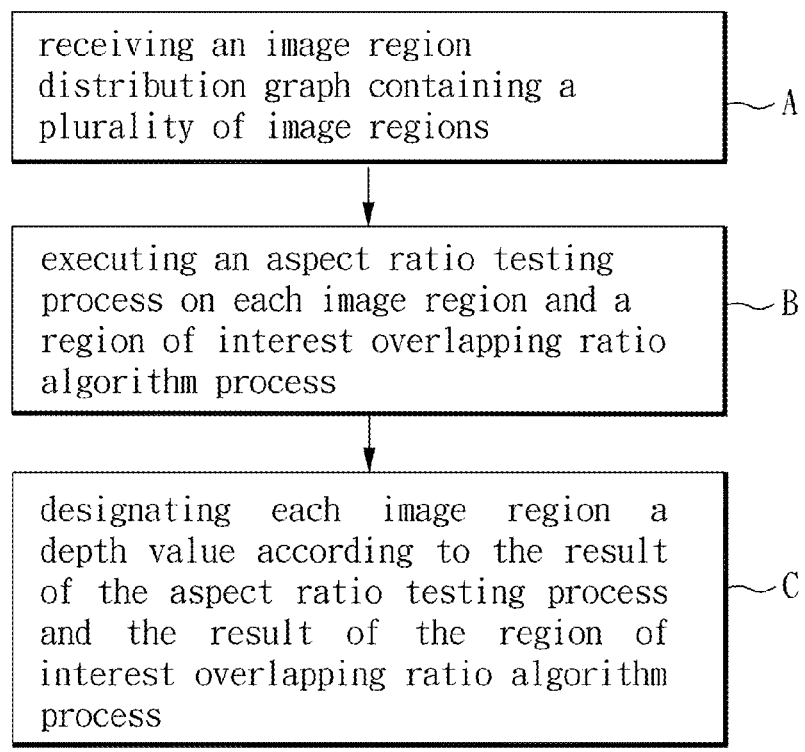
FIG. 1 is a flow chart of steps during operation of the depth map generation method according to an embodiment of the present invention.

LIST OF REFERENCE NUMERALS 21, 42 First image region
22, 43 Second image region
23, 44 Third image region
24, 45 Fourth image region
25, 46 Fifth image region
31 Image region
32 Image region having 70% area coverage
41 Standard image pixel
47 Region of interest

DETAILED DESCRIPTION OF THE PREFERRED EMBODIMENT

The invention is capable of other embodiments and of being practiced or carried out in various ways. Variations and modifications of the foregoing are within the scope of the present invention. It will also be understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

FIG. 1 shows a flow chart of steps during operation of the depth map generation method according to an embodiment of the present invention. An advantage of the depth map generation method according to an embodiment of the present invention is to produce a depth map corresponding to an image signal, wherein the image signal comprises a plurality of image regions, and each of the image regions is designated a depth value. As shown in FIG. 1, the depth map generation method of an embodiment of the present invention comprises the following steps:

(A) receiving an image region distribution map comprising a plurality of image regions and a region of interest distribution map comprising a region of interest;

(B) executing an aspect ratio testing process and a region of interest overlapping ratio calculation process on each image region; and (C) designating a depth value to each image region to produce the depth map according to a result of the aspect testing process and a result of the region of interest overlapping ratio calculation process;

Wherein, for the aforementioned image signal, the image region comprises a plurality of image pixels. Furthermore, for the image signal, the so-called region of interest (ROI) refers to the portion of the image signal that draws special attention, for example the portion of the image region that corresponds to a moving object. In addition, the aspect ratio test process executed in step (B) of the depth map generation method based on an embodiment of the present invention is used to calculate as aspect ratio value for each image region, and the overlapping percentage calculation process for the region of interest is used to calculate the percentage of each image region overlapping a region of interest.

Next, step (C) of the depth map generation method of an embodiment of the present invention involves designating a depth value to each image region by following the result from executing aspect ratio test, for example an aspect ratio value of an image region, and the result from executing overlapping percentage calculation process, for example a ratio of the area value of the image region divided by the area value of the region of interest. Therefore, a depth map corresponding to an image signal can be produced.

Figure 2:
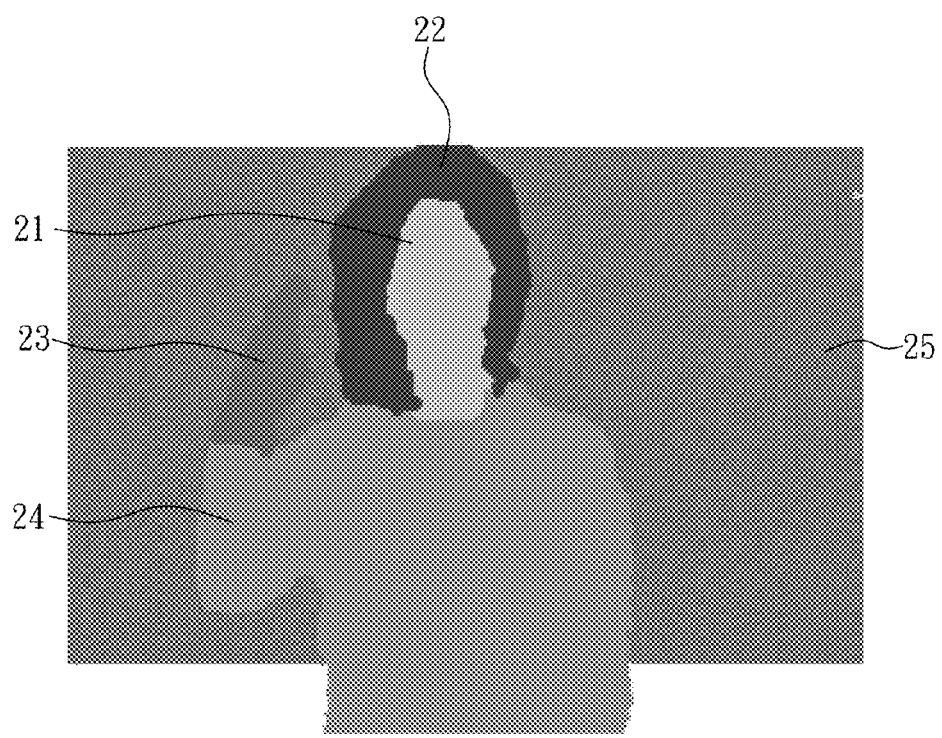
FIG. 2 is an image region distribution diagram showing distribution of a plurality of image regions.

Turning now to an example to further describe how a depth map generation method according to an embodiment of the present invention works:

First, in reference to FIG. 2, an image region distribution diagram showing distribution of a plurality of image regions is shown. Wherein, the image region distribution diagram contains five image regions, each corresponding to a first image region 21 of a human head, a second image region 22 corresponding to a human hair, a third image region 23 corresponding to a human finger, a fourth image region 24 corresponding to a human body, and a fifth image region 25 corresponding to a background setup.

Figure 3A:
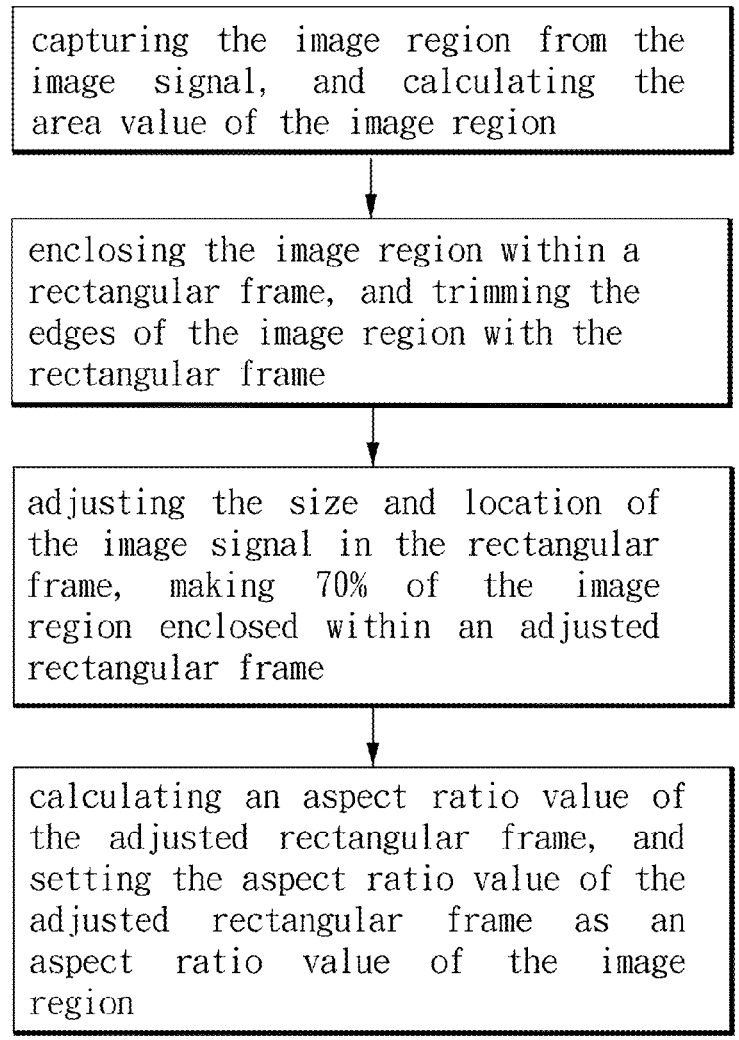
FIG. 3A is a flow chart of steps during operation of the aspect ratio capture method of the depth map generation method according to an embodiment of the present invention.

Next, in accordance with step (B) of the depth map generation method of an embodiment of the present invention, execute an aspect ratio test process and a region of interest overlapping percentage calculation process to each of the five image regions. In the present embodiment, the aforementioned aspect ratio test process points to executing an aspect ratio capture method to an image region. As shown in FIG. 3A, the aspect ratio capture method comprises the following steps:

capturing the image region from the image signal, and calculating the area value of the image region;

enclosing the image region within a rectangular frame, and trimming the edges of the image region using the rectangular frame;

adjusting the size and location of the rectangular frame in the image signal, making the adjusted rectangular frame enclose 70% of the area of the image region; and calculating an aspect ratio value of the adjusted rectangular frame, and setting the aspect ratio of the rectangular frame to be the aspect ratio value of the image region.

Figure 3B:
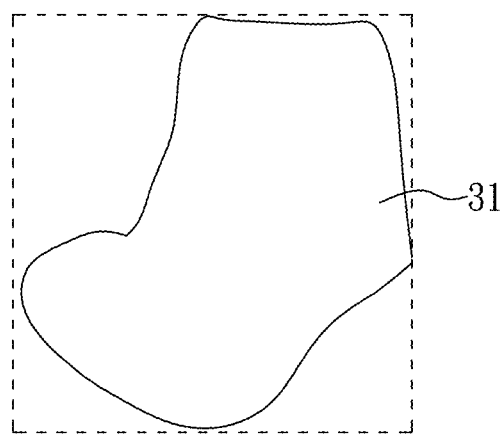
FIG. 3B is a diagram demonstrating a rectangular frame enclosing a portion of the image region, and cropping the edges of the image region.
Figure 3C:
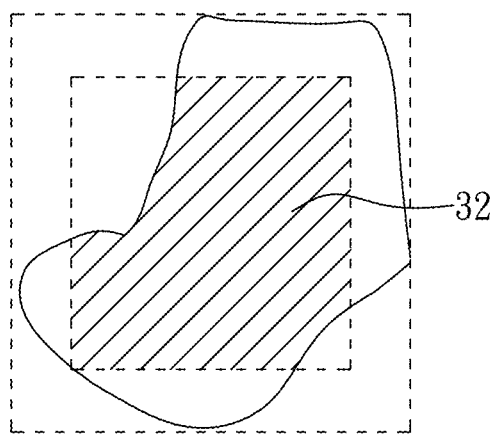
FIG. 3C is a diagram showing an adjusted rectangular frame enclosing a 70% area of the image region as presented after the size and position of the rectangular frame onto an image signal is adjusted.

Wherein, as shown in FIG. 3B, an illustrative diagram showing a rectangular frame enclosing the image region 31 within itself, and cropping the edges of the image region 31 is shown. Next, FIG. 3C shows an adjusted rectangular frame enclosing a 70% area of the image region, as a result of adjusting the size and position of the rectangular frame on the image signal.

In the present example, the aforementioned aspect ratio capture method is performed to the first image region 21 (corresponding to a human head)) to obtain an aspect ratio value of the first image region 21 to be 0.45 (45/99). Next, the aspect ratio value and the aspect ratio threshold value are compared against each other. In the present embodiment, the aspect ratio threshold value is between 1.1 and 1.3. and preferably 1.1765 or 1.25.

As previously mentioned, since the aspect ratio value of the first image region 21 (being 0.45) is lower than the aforementioned aspect ratio threshold value, the depth value designated to the first image region 21 is identical to the depth value designated to another image region (the fourth image region 21 corresponding to a human body) that is perpendicular and neighboring the image region. It will be understood here that the object for executing the aforementioned aspect ratio test process is to determine whether an image region corresponds to a standing object, for example a person or a tree. After some particular image regions undergo the aforementioned aspect ratio test process, if the result turns to be that the object corresponds to a standing object aspect ratio test process, for example the aforementioned first image region 21 corresponding to a person head, the second image region 22 corresponding to a person hair, the third image region 23 corresponding to person finger, and the fourth image region 24 corresponding to a person body, these image regions can then be reasonably designated identical depth values (since in comparison to the background setup, the depth values of the image regions belonging to a person can almost be considered to be completely the same.

Figure 4A:
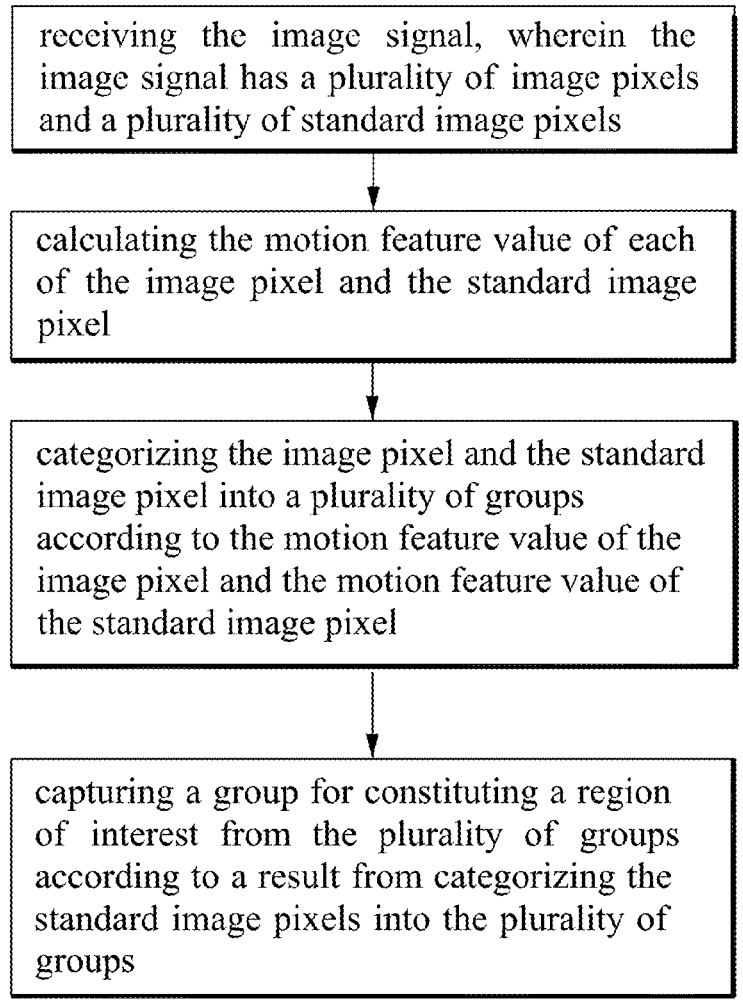
FIG. 4A illustrates a flow chart of steps during operation of generating a graph showing distribution for region of interest of the depth map generation method according to an embodiment of the present invention.

In another aspect of the present invention, the overlapping percentage calculation process of the aforementioned region of interest are used to calculate an overlapping percentage between each image region and a region of interest. The overlapping percentage rate is a ratio of the area value of the image region divided by the area value of the region of interest. The following description relates to how to obtain a region of interest having a region of interest:

In the present embodiment, the aforementioned region of interest distribution map is obtained from executing a region of interest distribution map method. As shown in FIG. 4A, the method comprises the following steps:

receiving the image signal, wherein the image signal has a plurality of image pixels and a plurality of standard image pixels;

calculating the motion feature value of each of the image pixel and the standard image pixel;

categorizing the image pixel and the standard image pixel into a plurality of groups according to the motion feature value of the image pixel and the motion feature value of the standard image pixel; and capturing a group for constituting a region of interest from the plurality of groups according to a result from categorizing the standard image pixels into the plurality of groups.

Figure 4B:
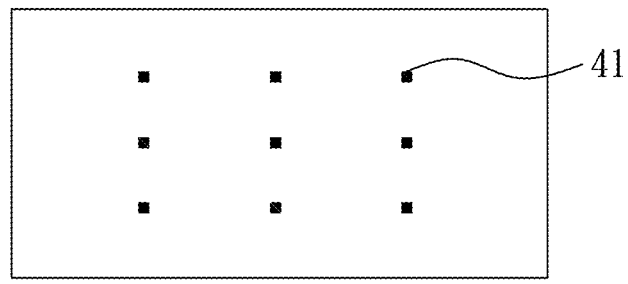
FIG. 4B is an illustrative diagram showing distribution of nine default image pixels of an image pixel.

Wherein, in the present embodiment, the number of the plurality of the aforementioned default image pixels 41 is nine, and their position in the image signal is identical, as shown in FIG. 4B.

Figure 4C:
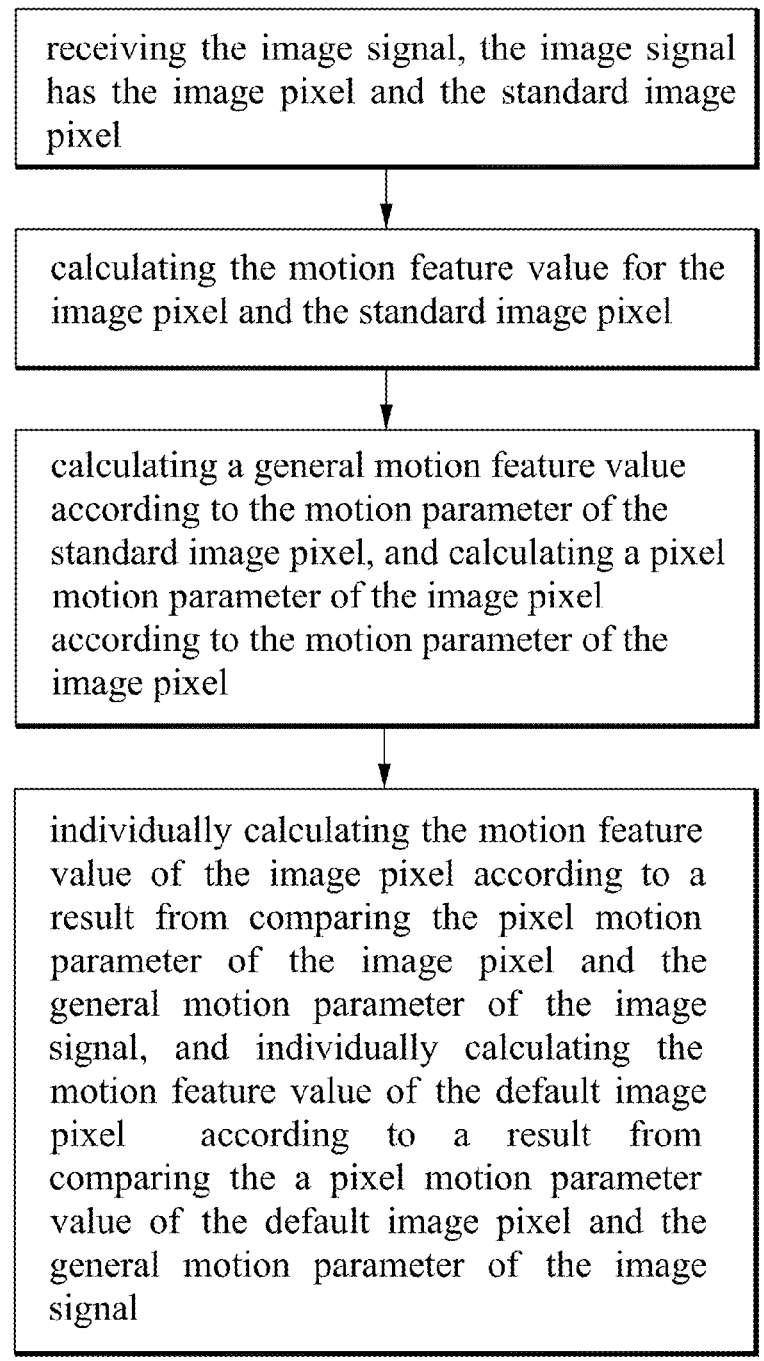
FIG. 4C shows a flow chart of steps during operation of calculating for each of a plurality of image pixels and motion feature values of a plurality of default image pixels.

In addition, as shown in FIG. 4C, the image pixel and the default image pixel each contains a motion feature value, which may be calculated as follows:

receiving the image signal, the image signal has the image pixel and the standard image pixel;

calculating the motion feature value for the image pixel and the standard image pixel;

calculating a general motion feature value according to the motion parameter of the standard image pixel, and calculating a pixel motion parameter of the image pixel according to the motion parameter of the image pixel; and individually calculating the motion feature value of the image pixel according to a result from comparing the pixel motion parameter of the image pixel and the general motion parameter of the image signal, and individually calculating the motion feature value of the default image pixel according to a result from comparing the a pixel motion parameter value of the default image pixel and the general motion parameter of the image signal.

Wherein, an x-axis component $MV_x$ of a motion vector and a y-axis component $MV_y$ of a motion vector are obtained from the motion parameter for each of the image pixel and the default image pixel through comparing the displacement of these image pixels (default image pixels) inbetween the image signal and an earlier image signal. The aforementioned motion parameter will then be obtained from further subjecting the above through a magnitude operation.

In another aspect of the present invention, an intermediate number process is performed after the motion parameters of each of the nine default image pixels 41 are obtained so as to capture an intermediate number from these nine motion parameters. Afterward, the intermediate number is set as the general motion parameter (GMP) of the image signal. In addition, the motion parameter of the image pixel is set as a pixel motion parameter of the image pixel.

Furthermore, the aforementioned "individually calculating the motion feature value of the image pixel according to a result from comparing the pixel motion parameter of the image pixel and the general motion parameter of the image signal" refers to capturing the pixel motion parameter (PMP) of an image pixel and the general motion pixel (GMP) of the image signal. By the same principle, the aforementioned "individually calculating the motion feature value of the default image pixel according to a result from comparing the pixel motion parameter of the default image pixel and the general motion parameter of the image signal" refers to capturing the pixel motion parameter (PMP) of the default image pixel and the general motion parameter (GMP) of the image signal, wherein the larger value of the two is the motion feature value of the default image pixel.

The motion feature value of each of the image pixel and default image pixel can be obtained from the image signal as a result of the above operation.

Turning now to FIG. 4A, after the motion feature value of each of the image pixel and default image pixel are obtained from the image signal, each of the image pixel and default image pixel is categorized into a plurality of groups according to the motion feature value of each image pixel and the motion feature value of each default image pixel. Generally speaking, the categorization process may set out to be selected from K-means grouping algorithm, CRLA (constraint run length algorithm) grouping algorithm), or SBKM (symmetry distance based K-means algorithm) grouping algorithm, etc. K-means grouping algorithm is preferred in view of the present embodiment.

Next, according to the result of grouping from categorizing the default image pixels, which is the result of categorizing the nine default image pixels into a plurality of groups, a group for constructing a region of interest is captured from these groups. In the present embodiment, these nine default image pixels are categorized into two groups, which includes a group comprising a plurality of default image pixels for which a motion feature value is equal to the lowest threshold value of a motion feature value, and a group comprising a plurality of default image pixels for which a motion feature value is higher than the lowest threshold value of a motion feature value. In the present embodiment, the lowest threshold for the aforementioned motion feature value is 4.

For the present case, in addition to the aforementioned nine default image pixels, the plurality of image pixels contained in the image signal are categorized into the two aforementioned groups. These include a group comprising a plurality of image pixels for which a motion feature value is equal to the lowest threshold value of a motion feature value, and a group comprising a plurality of image pixels for which a motion feature value is higher than the lowest threshold value of a motion feature value.

The following step involves capturing a group having a lower number of default image pixels so as to form a group for constituting a region of interest, according to the number of default image pixels contained in each group. This extends to mean that the number of default image pixels for constituting a group of region of interest is lower than the number of default image pixels failing to constitute a group of region of interest.

Lastly, the plurality of image pixels and the plurality of default image contained in the captured group for constituting a region of interest are categorized into a plurality of image pixels and a plurality of default image pixels, which thereby are set as the region of interest (ROI) of the image signal.

Figure 4D:
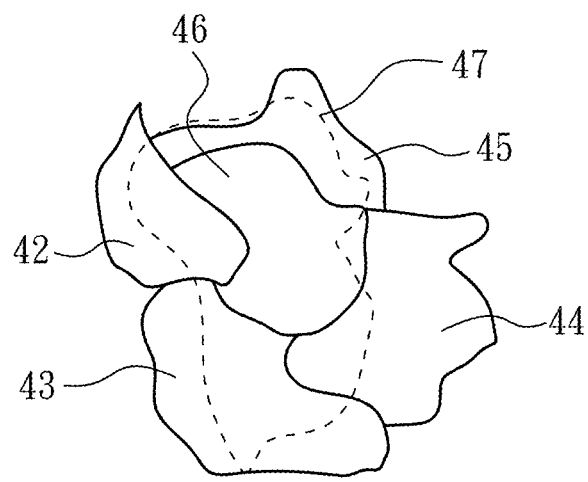
FIG. 4D is a distribution diagram for five image regions and one region of interest in an image signal.

As such, a region of interest distribution map described as being received in step (A) of the depth map generation method according to an embodiment of the present invention can be obtained, as illustrated in FIG. 4D. Of which, there are five image regions in FIG. 4D, they are each the first image region 42, the second image region 43, the third image region 44, the fourth image region 45, and the fifth image region 46. Furthermore, the area enclosed within the dotted line is the region of interest 47.

The next step is to execute the aforementioned overlapping percentage calculation process for the region of interest, so as to calculate the overlapping percentage of each image region. And the completion of calculation, without regards to the third image region 44, the overlapping percentage rates of the remaining four image region (including the first image region 42, the second image region 43, the fourth image region 45 and the fifth image region 46) are each higher than the overlapping percentage threshold value. The overlapping percentage threshold value generally covers a range between 50% and 80%. However in the present embodiment, the overlapping percentage threshold value is 60%.

Figure 4E:
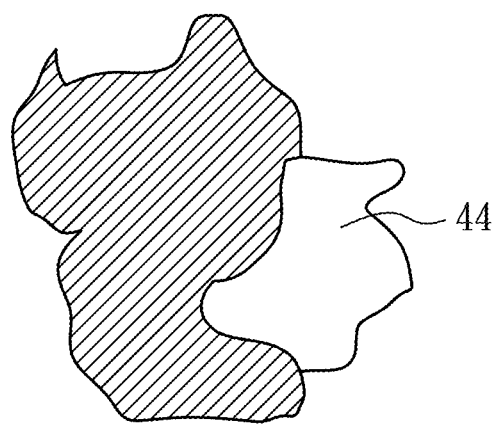
FIG. 4E is an illustrative diagram exhibiting the result of designating equal depth values among four image regions according to the five image regions of FIG. 4D.

Therefore, as demonstrated in FIG. 4E, because the aforementioned four image regions (which refers to the area covered by shadowed region) are neighboring each other and each has an overlapping percentage threshold value higher than the overlapping percentage threshold value, they are consequently designated an identical depth value.

As described before, after the performance of step (B) of the depth map generation method according to an embodiment of the present invention, the aspect ratio value and overlapping percentage value of each image region can be determined. Further, a depth value is designated to each image region according to the numerical relationship between the aspect ratio value of each image region and the aspect ratio threshold value, as well as the numerical relationship between the overlapping percentage value and the overlapping percentage threshold value. Therefore, a depth map corresponding to an image signal can be produced.

The following disclosure will describe how the depth map generation method of an embodiment of the present invention designates a depth value to an image region under the conditions imposed by different numerical relationship.

Figure 5A:
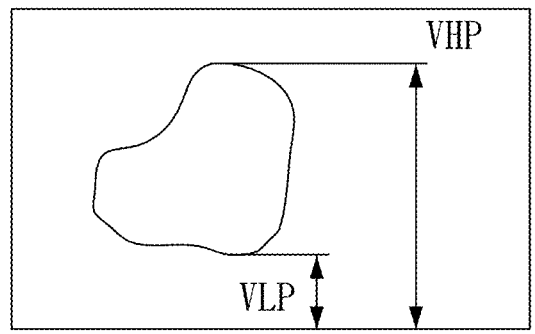
FIG. 5A is a diagram displaying designation of an identical depth value for a plurality of image pixels.

Firstly, when the aspect ratio value of the image region is lower than the aspect ratio threshold value, or when the overlapping percentage of the image region is higher than the overlapping percentage threshold value, the depth value designated to the image region can be calculated by the following formula:

$$D = 1 - \frac{VLP}{h};$$ (Formula 1)

where VLP is the location of the lowest image pixel in the image signal between the image region, another image region perpendicular and neighboring the image region, and an image region neighboring the texture color feature region, h is a height value of the image signal. The distribution of the image regions in the image signal is graphically demonstrated in FIG. 5A.

As having described above, since the aspect ratio value of the image region is lower than the aspect ratio threshold value, or when the overlapping percentage of the image region is higher than the overlapping percentage threshold value, the plurality of image regions including the image region, the image region perpendicular and neighboring the image region, and the image regions neighboring each other is each designated a depth value of D.

Secondly, when the aspect ratio value of the image region is lower than the aspect ratio threshold value, and the overlapping percentage of the image region is not higher than the overlapping percentage threshold value, the depth value D designated to the image region can be determined by the following formula:

$$D = D_{min} + \frac{(D_{max} - D_{min}) \times (VCP - VLP)}{(VHP - VLP)};$$ (Formula 2)

where VHP is the location of the highest image pixel in thee image signal between the image region, another image region perpendicular and neighboring the image region, and image regions neighboring each other; VLP is the location of the lowest image pixel in the image signal between the image region, another image region perpendicular and neighboring the image region, and image regions neighboring each other; VCP is the location of an image pixel to be assigned a depth value in the image signal between the image region, another image region perpendicular and neighboring the image region, and image regions neighboring each other; h is the height value of the image signal, $D_{min}$ is the smallest depth value, the value of which is $$1 - \frac{VLP}{h},$$

$D_{max}$ is the largest depth value, the value which is $$1 - \frac{VHP}{h}.$$

Figure 5B:
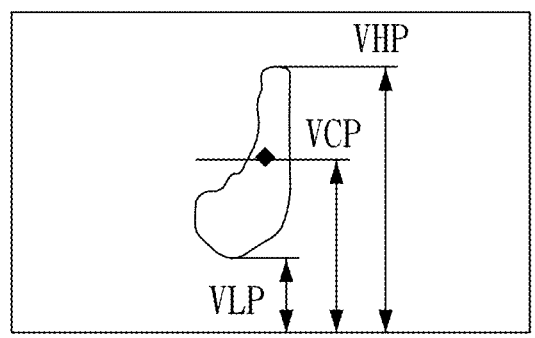
FIG. 5B is a diagram displaying designation of a linear distribution of depth values for a plurality of image pixels.

The manner by which the image regions are distributed in the image signal are as shown in FIG. 5B.

Figure 5C:
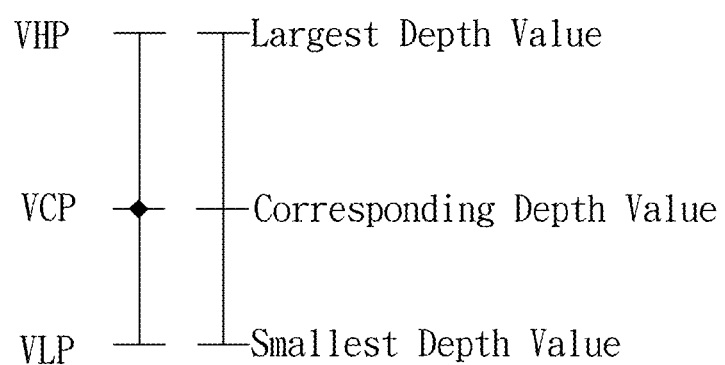
FIG. 5C shows a chart exhibiting the linear relationship corresponding to a depth value for use in attributing a pending depth value to an image pixel.

And as will be understood to persons of ordinary skill in the art in FIG. 2, in the present embodiment, the depth value of an image pixel for a to-be-assigned depth value of the image region is linearly correlated to the location of an image pixel in the image signal, and such correlation can be seen in FIG. 5C. However, in some applications, the aforementioned linear relationship may be adjusted to other relationships of different types, including second order relationship or third order relationship.

Figure 6:
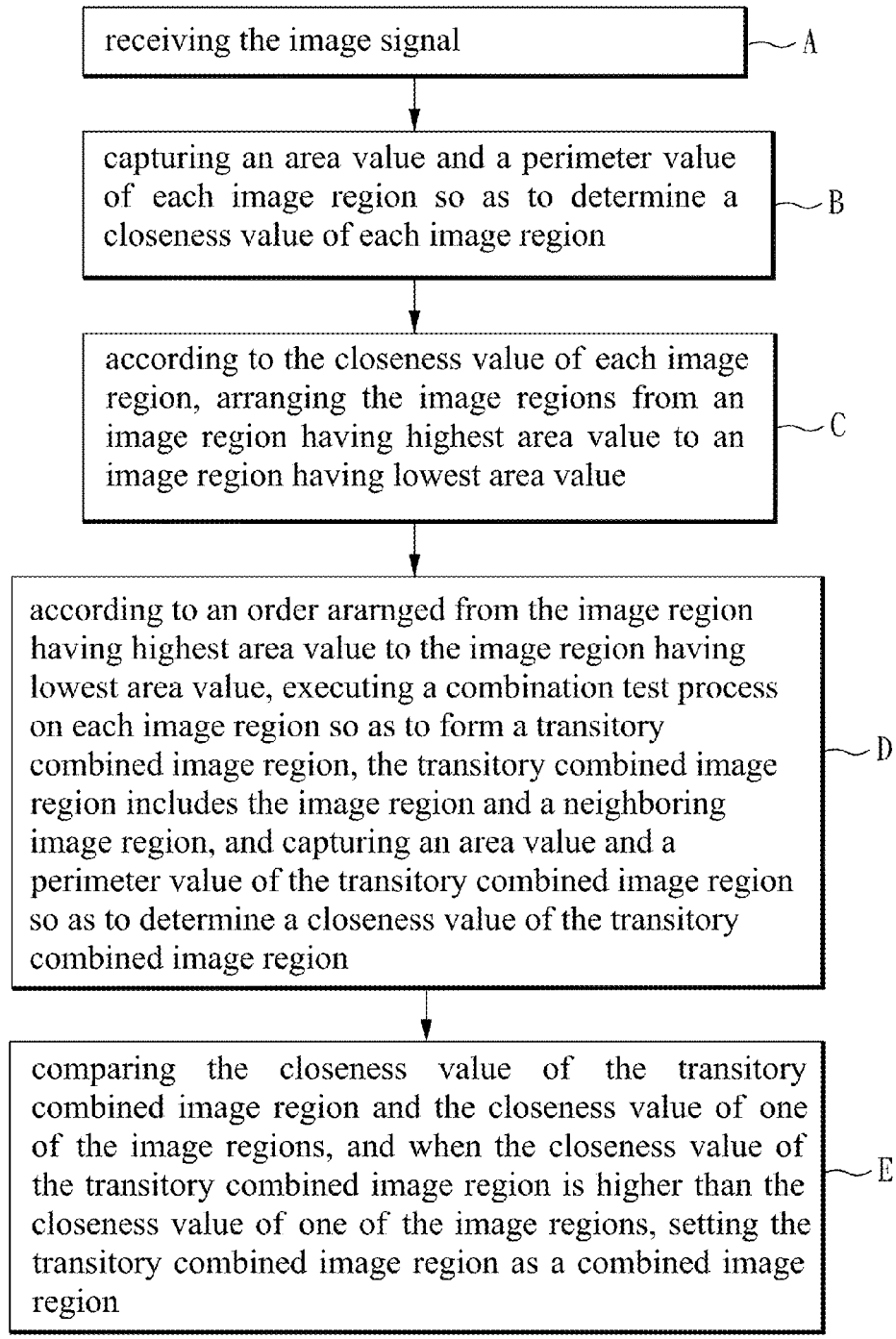
FIG. 6 illustrates a flow chart of steps during operation of an image segment merging process according to an embodiment of the present invention.

In the depth map generation method according to an embodiment of the present invention, the image region distribution map received in step (A) is obtained as a result of executing the image region merging method. As disclosed in FIG. 6, image region merging method comprises the following steps:

(A) receiving the image signal;

(B) capturing an area value and a perimeter value of each image region so as to determine a closeness value of each image region;

(C) according to the closeness value of each image region, arranging the image regions from an image region having highest area value to an image region having lowest area value;

(D) according to an order arranged from the image region having highest area value to the image region having lowest area value, executing a combination test process on each image region so as to form a transitory combined image region, the transitory combined image region includes the image region and a neighboring image region, and capturing an area value and a perimeter value of the transitory combined image region so as to determine a closeness value of the transitory combined image region; and (E) comparing the closeness value of the transitory combined image region and the closeness value of one of the image regions, and when the closeness value of the transitory combined image region is higher than the closeness value of one of the image regions, setting the transitory combined image region as a combined image region.

In consideration that the various applied parameters, such as the color feature, texture feature, or closeness value of the image region have been well-received and widely used in the public domain as part of an algorithm for determining whether a neighboring image region should be merged, the detailed procedure for the image region merging method based on a closeness value of an image region, wherein the plurality of image regions are merged into a merged image region will not be further described.

Accordingly, the depth map generation method according to an embodiment of the present invention is demonstrated to be capable of producing a depth map corresponding to the image signal based on the distribution of region of interest in the image signal, and the aspect ratio value of each of the image region.

Figure 7:
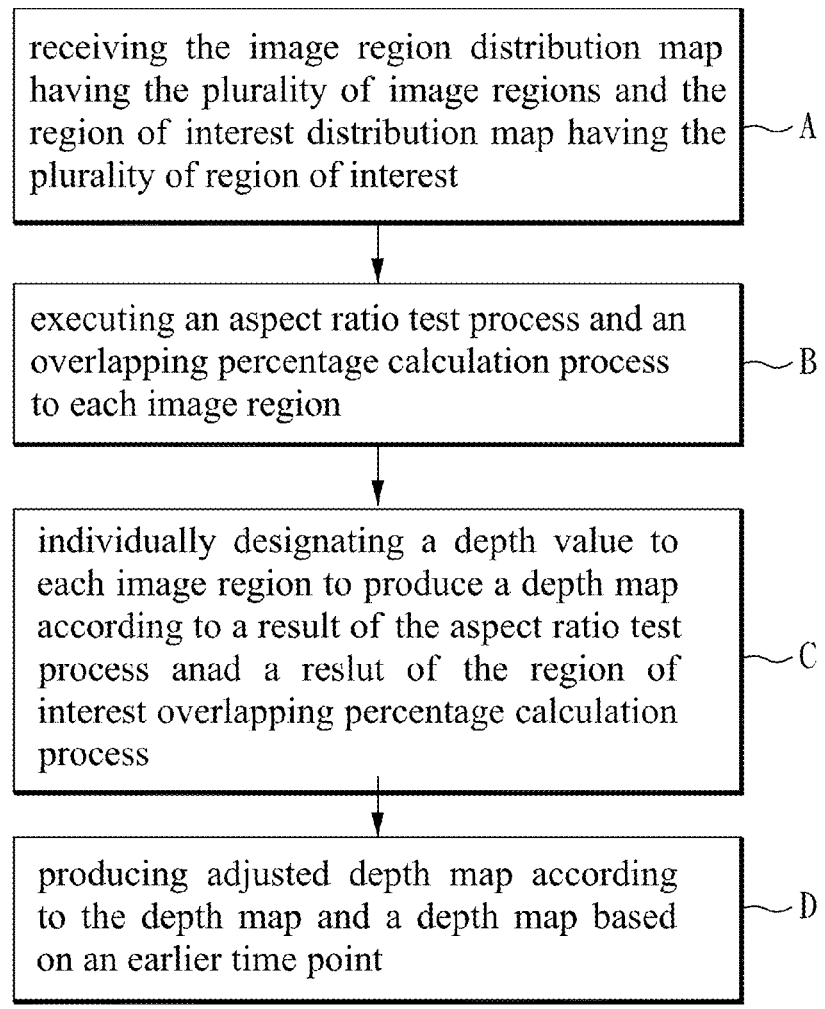
FIG. 7 is a flow chart of steps during operation of depth map generation method according to another embodiment of the present invention.

Turning now to FIG. 7, a depth map generation method according to another embodiment of the present invention is provided. Wherein, the depth map generation method according to another embodiment of the present invention is used to produce an adjusted depth map corresponding to the image signal. The image signal comprises a plurality of image regions, and adjusted depth map from the image region is designated a depth value. As disclosed in FIG. 7, the depth map generation method according to an embodiment of the present invention comprises the following steps:

(A) receiving the image region distribution map having the plurality of image regions and the region of interest distribution map having the plurality of region of interest;

(B) executing an aspect ratio test process and an overlapping percentage calculation process to each image region;

(C) individually designating a depth value to each image region to produce a depth map according to a result of the aspect ratio test process and a result of the region of interest overlapping percentage calculation process; and (D) producing adjusted depth map according to the depth map and a depth map based on an earlier time point.

Wherein, the image region comprises a plurality of image pixels, the aspect ratio test process is used for calculating the aspect ratio value of each image region, and when the aspect ratio value of one of the image region is lower than the aspect ratio threshold, the depth value designated to the image region is identical to the depth value designated to another perpendicular and neighboring image region; the region of interest overlapping percentage calculation process is used in calculating the overlapping percentage between the image region and the region of interest, and the image regions neighboring each other and of which having an overlapping percentage higher than the overlapping percentage threshold are each designated an identical depth value.

Since steps (A) to (C) of the depth map generation method according to another embodiment of the present invention are the steps (A) to (C) of the depth map generation method according to an embodiment of the present invention. Therefore for the depth map generation method of another embodiment of the present invention, the detailed operation procedure of steps (A) to (C) and other possible embodiments will not be further described.

Figure 8:
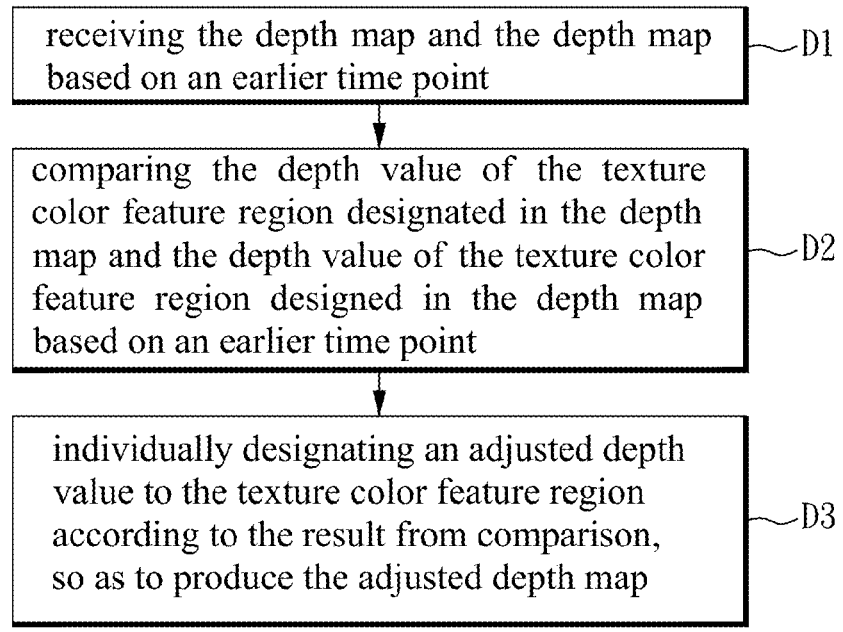
FIG. 8 shows a chart of sub-steps for the step (D) of the depth map generation method according to another embodiment of the present invention.

Yet the detailed operation procedure for step (D) of the depth map generation method according to another embodiment of the present invention will be described below:

As shown in FIG. 8, a chart of sub-steps for the step (D) of the depth map generation method according to another embodiment of the present invention is presented. Wherein, step (D) of the depth map generation method of another embodiment of the present invention comprises:

D1) receiving the depth map and the depth map based on an earlier time point;

(D2) comparing the depth value of the texture color feature region designated in the depth map and the depth value of the texture color feature region designated in the depth map based on an earlier time point; and (D3) individually designating an adjusted depth value to the texture color feature region according to the result from comparison, so as to produce the adjusted depth map.

Figure 9:
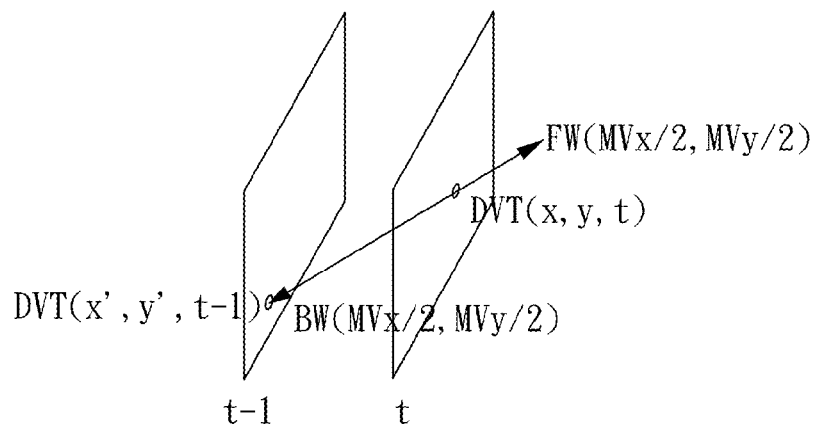
FIG. 9 is a diagram showing the relationship between each of the parameters used in generating an anterior depth map based on a forward motion vector and a backward motion vector.

Furthermore, for the depth map generation method according to another embodiment of the present invention, the depth map based on an earlier time point of step (D) applies a depth map calculation formula of an earlier time point, which can be determined from a forward-moving vector and a backward-moving vector from the depth map based on an earlier time point. Wherein, the calculation formula for the aforementioned depth map of an earlier time point is:

$$DVT(x, y, t) = DVT(x', y', t-1);$$  (Formula 3)
where,
$$x' = x - \frac{(FW\_MV_x - BW\_MV_x)}{2};$$  (Formula 4)
$$y' = y - \frac{(FW\_MV_y - BW\_MV_y)}{2};$$  (Formula 5)

and further in Formulas 3, 4, and 5, DVT (x, y, t) is the location of the texture color feature region in the depth map in the two-dimensional image signal. DVT (x', y', t−1) is the location of the texture color feature region in a depth map based on an earlier time point, FW_MV$_x$ is an x-axis vector of a forward motion vector, FW_MV$_y$ is a y-axis vector of the forward motion vector, BW_MV$_x$ is an x-axis vector of a backward motion vector, BW_MV$_y$ is a y-axis vector of the backward motion vector. In addition, the relationship between the parameters of Formulas 3, 4, and 5 can be seen in FIG. 9.

With reference now to FIG. 8, in step (D2), the depth value designated to each image region in the depth map is compared against the depth value of a depth map based on an earlier time point in the same image region. Afterward, in step (D3), an adjusted depth value is designated to each image region according to a result of step (D2). An adjusted depth map is accordingly produced. The depth map generation method according to another embodiment of the present invention designates an adjusted depth value to each image region according to different settings. Such settings are within the scope of the numerical relationship between the depth value designated to the image region in the depth map and the depth value designated to the image region based on an earlier time point in the depth map.

Firstly, for the first situation: (1) when the difference between a depth value (DVT) designated to an image region in a depth map based on an earlier time point and a depth value (DVS) designated to the same image region in a depth map is lower than an adjusted threshold value (ΔE), (which is DVT−DVS<ΔE); and (2) when the depth value (DVT) designated to an image region in a depth map based on an earlier time point is lower than the result of 1 subtracting the adjusted threshold value (ΔE), (which is DVT<1−ΔE), the depth value D designated to the image region in the adjusted depth map is to be set as:

The depth value (DVT) designated to the image region in the depth map based on an earlier time point, plus the adjusted threshold value (ΔE), which is represented by D=DVT+ΔE.

Secondly, for the second situation: (1) when the difference between a depth value (DVT) designated to an image region in a depth map based on an earlier time point and a depth value (DVS) designated to the same image region in a depth map is higher than an adjusted threshold value (ΔE), (which is DVT−DVS>ΔE); and (2) when the depth value (DVT) designated to an image region in a depth map based on an earlier time point is higher than the adjusted threshold value (ΔE), (which is DVT>ΔE), the depth value D designated to the image region in the adjusted depth map is to be set as:

The depth value (DVT) designated to the image region in the depth map based on an earlier time point, minus the adjusted threshold value (ΔE), which is represented by D=DVT−ΔE.

Finally, when the above two situations do not happen, the depth value D designated to the image region in the adjusted depth map is:

The depth value (DVT) designated to the image region in the depth map based on an earlier time point, which is represented by D=DVT Therefore, the depth map generation method according to another embodiment of the present invention has been demonstrated to produce an adjusted depth map, through a means of comparing a depth map and a depth map based on an earlier time point, so as to more precisely designate an adjusted depth value of an image region to an image signal, and effectively increase the conversion efficiency of a 2D to 3D image/video transformation system.

Although the present invention has been explained in relation to its preferred embodiment, it is to be understood that many other possible modifications and variations can be made without departing from the spirit and scope of the invention as hereinafter claimed.

What is claimed is:

1. A depth map generation method for producing a depth map belonging to an image signal, executed by an image processing device, wherein the image signal comprises a plurality of image regions, and each image region in the depth map is designated a depth value, comprising:
   (A) receiving an image region distribution map comprising a plurality of image regions and a region of interest distribution map comprising a region of interest;
   (B) executing an aspect ratio testing process and a region of interest overlapping ratio calculation process on each image region; and
   (C) designating a depth value to each image region to produce the depth map according to a result of the aspect testing process and a result of the region of interest overlapping ratio calculation process;
   wherein, the image region has a plurality of image pixels, the aspect ratio testing process is used to calculate an aspect ratio value of the image region, and when the aspect ratio value of one of the image region is lower than the aspect ratio threshold value, the depth value designated to the image region and the depth value of another image region perpendicular and neighboring to the image region are identical; the region of interest overlapping ratio calculation process is used to calculate an overlapping ratio between the image region and the region of interest, and the image regions that are neighboring each other and of which each having an overlapping ratio higher than the overlapping ratio threshold value are all designated an identical depth value;
   wherein, the depth map generation method further comprising a step (D), which produces an adjusted depth map according to a depth map and a depth map based on an earlier time point, comprising:
   (D1) receiving the depth map and the depth map based on an earlier time point;
   (D2) comparing the depth value of the texture color feature region designated in the depth map and the depth value of the texture color feature region designated in the depth map based on an earlier time point; and
   (D3) individually designating an adjusted depth value to the texture color feature region according to the result from comparison, so as to produce the adjusted depth map;
   wherein the depth map based on an earlier time point works according to a depth map operation formula based on an earlier time point, and from the depth map the result is calculated:

wherein, the depth map operation formula based on an earlier time point is:

$$DVT(x, y, t) = DVT(x', y', t-1);$$
$$x' = x - \left(\frac{(FW - MV_x - BW - MV_x)}{2}\right);$$
$$y' = y - \left(\frac{(FW - MV_y - BW - MV_y)}{2}\right);$$

where DVT(x, y, t) is the location of the texture color feature region in the depth map in the two-dimensional image signal. DVT(x', y', t−1) is the location of the texture color feature region in a depth map based on an earlier time point, $FW\_MV_x$ is an x-axis vector of a forward motion vector, $FW\_MV_y$ is a y-axis vector of the forward motion vector, $BW\_MV_x$ is an x-axis vector of a backward motion vector, $BW\_MV_y$ is a y-axis vector of the backward motion vector, x is the location of x-axis of the texture color feature region in the depth map in the two-dimensional image signal, x' is the location of x-axis of the texture color feature region in the depth map in the two-dimensional image signal based on an earlier time point, y is the location of y-axis of the texture color feature region in the depth map in the two-dimensional image signal, y' is the location of y-axis of the texture color feature region in the depth map in the two-dimensional image signal based on the earlier time point, t is the time of the texture color feature region in the depth map in the two-dimensional image signal, t−1 is the earlier time point.

2. The depth map generation method according to claim 1, wherein in step (C), when the aspect ratio value of the image region is lower than the aspect ratio threshold value, or when the overlapping percentage of the image region is higher than the overlapping percentage threshold value, the depth value designated to the image region can be calculated by the following formula:

$$D = 1 - \frac{VLP}{h}$$

where D is the depth value designated to the image region, VLP is the location of the lowest image pixel in the image signal between the image region, another image region perpendicular and neighboring the image region, and an image region neighboring the texture color feature region, h is a height value of the image signal.

3. The depth map generation method according to claim 1, wherein in step (C), when the aspect ratio value of the image region is lower than the aspect ratio threshold value, and the overlapping percentage of the image region is not higher than the overlapping percentage threshold value, the depth value D designated to the image region can be determined by the following formula:

$$D = D_{min} + \frac{(D_{max} - D_{min}) \times (VCP - VLP)}{(VHP - VLP)}$$

where VHP is the location of the highest image pixel in the image signal between the image region, another image region perpendicular and neighboring the image region, and image regions neighboring each other; VLP is the location of the lowest image pixel in the image signal between the image region, another image region perpendicular and neighboring the image region, and image regions neighboring each other; VCP is the location of an image pixel to be assigned a depth value in the image signal between the image region, another image region perpendicular and neighboring the image region, and image regions neighboring each other; h is a height value of the image signal, $D_{min}$ is the smallest depth value, the value of which is $$1 - \frac{VLP}{h},$$

$D_{max}$ is the largest depth value, the value which is $$1 - \frac{VHP}{h}.$$

4. The depth map generation method as claimed in claim 1, wherein the image region distribution map is obtained from executing an image region merging method, and the image region merging method comprising:
   (A) receiving the image signal;
   (B) capturing an area value and a perimeter value of each image region so as to determine a closeness value of each image region;
   (C) according to the closeness value of each image region, arranging the image regions from an image region having highest area value to an image region having lowest area value;
   (D) according to an order arranged from the image region having highest area value to the image region having lowest area value, executing a combination test process on each image region so as to form a transitory combined image region, the transitory combined image region includes the image region and a neighboring image region, and capturing an area value and a perimeter value of the transitory combined image region so as to determine a closeness value of the transitory combined image region; and
   (E) comparing the closeness value of the transitory combined image region and the closeness value of one of the image regions, and when the closeness value of the transitory combined image region is higher than the closeness value of one of the image regions, setting the transitory combined image region as a combined image region.

5. The depth map generation method as claimed in claim 1, wherein the aspect ratio threshold value is between 1.1 and 1.3, the overlapping percentage is a ratio of the area value of the image region divided by the area value of the region of interest, and the overlapping percentage threshold value is between 50% and 80%.

6. The depth map generation method as claimed in claim 1, wherein in step (B), the aspect ratio of the image region is obtained from executing an aspect ratio capture method, and the aspect ratio capture method comprises:
   capturing the image region from the image signal, and calculating the area value of the image region;
   enclosing the image region within a rectangular frame, and trimming the edges of the image region using the rectangular frame;

adjusting the size and location of the rectangular frame in the image signal, making the adjusted rectangular frame enclose 70% of the area of the image region; and calculating an aspect ratio value of the adjusted rectangular frame, and setting the aspect ratio of the rectangular frame to be the aspect ratio value of the image region.

7. The depth map generation method as claimed in claim 1, wherein the region of interest distribution map executes a region of interest distribution map generation method, and the region of interest distribution map comprises the following steps:

receiving the image signal, wherein the image signal has a plurality of image pixels and a plurality of standard image pixels;

calculating the motion feature value of each of the image pixel and the standard image pixel;

categorizing the image pixel and the standard image pixel into a plurality of groups according to the motion feature value of the image pixel and the motion feature value of the standard image pixel; and capturing a group for constituting a region of interest from the plurality of groups according to a result from categorizing the standard image pixels into the plurality of groups.

8. The depth map generation method as claimed in claim 7, wherein a number of the standard image pixels of a group constituting the region of interest is lower than a number of the standard image pixels of a remaining group not constituting the region of interest.

9. The depth map generation method as claimed in claim 7, wherein the dynamic feature value of the image pixel and the standard image pixel are calculated from the following steps:

receiving the image signal, the image signal has the image pixel and the standard image pixel;

calculating the motion feature value for the image pixel and the standard image pixel;

calculating a general motion feature value according to the motion parameter of the standard image pixel, and calculating a pixel motion parameter of the image pixel according to the motion parameter of the image pixel; and individually calculating the motion feature value of the image pixel according to a result from comparing the pixel motion parameter of the image pixel and the general motion parameter of the image signal.

10. The depth map generation method as claimed in claim 1, wherein in step (D3), when the difference between a depth value designated to an image region in a depth map based on an earlier time point and a depth value designated to the same image region in a depth map is lower than an adjusted threshold value, and when the depth value designated to an image region in a depth map based on an earlier time point is lower than the result of 1 subtracting the adjusted threshold value, the depth value designated to the image region in the adjusted depth map is to be set as the depth value designated to the image region in the depth map based on an earlier time point, plus the adjusted threshold value.

11. The depth map generation method as claimed in claim 10, wherein in step (D3), when the difference between a depth value designated to an image region in a depth map based on an earlier time point and a depth value designated to the same image region in a depth map is higher than an adjusted threshold value, and when the depth value designated to an image region in a depth map based on an earlier time point is higher than the adjusted threshold value, the depth value designated to the image region in the adjusted depth map is to be set as: the depth value designated to the image region in the depth map based on an earlier time point, minus the adjusted threshold value.

12. The depth map generation method as claimed in claim 11, wherein in step (D3), the depth value designated to the image region in the adjusted depth map is set as the depth value designated to the image region in the depth map based on an earlier time point.

* * * * *